US011331645B2

(12) United States Patent
Rankin

(10) Patent No.: US 11,331,645 B2
(45) Date of Patent: May 17, 2022

(54) FILTER MEDIA FOR RESPIRATORY PROTECTION

(71) Applicant: 3M INNOVATIVE PROPERTIES COMPANY, St. Paul, MN (US)

(72) Inventor: Matthew A. Rankin, Brockville (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/249,811

(22) Filed: Mar. 15, 2021

(65) Prior Publication Data
US 2021/0197170 A1  Jul. 1, 2021

Related U.S. Application Data

(63) Continuation of application No. 15/568,584, filed as application No. PCT/US2016/028364 on Apr. 20, 2016, now Pat. No. 10,974,222.

(60) Provisional application No. 62/153,555, filed on Apr. 28, 2015.

(51) Int. Cl.
*B01J 20/00*  (2006.01)
*B01J 20/02*  (2006.01)
*B01J 20/28*  (2006.01)

(52) U.S. Cl.
CPC ....... *B01J 20/0229* (2013.01); *B01J 20/2808* (2013.01); *B01J 20/28057* (2013.01); *B01J 20/28083* (2013.01)

(58) Field of Classification Search
CPC ............... B01D 39/06; B01D 2253/10; B01D 2257/60; B01D 53/64; B01D 15/00; B01D 46/0027; B01D 46/0036; B01D 46/521; B01D 46/62; B01D 53/70; B01D 53/8662; C01G 49/02; C01G 49/06; C01G 49/08; B01J 20/06; B01J 20/0229; B01J 20/08; B01J 20/3236; B01J 20/0222; B01J 23/78; B01J 29/40; B01J 35/0006; B01J 35/002; B01J 35/006
See application file for complete search history.

(56) References Cited

U.S. PATENT DOCUMENTS 5,100,856 A    3/1992  Soled
5,580,839 A *  12/1996 Huffman ............... B01J 23/745
                                                       502/202
6,468,942 B1   10/2002 Sansalone
(Continued)

FOREIGN PATENT DOCUMENTS

CN    103127899    6/2013
JP    2011-213572  10/2011
(Continued)

OTHER PUBLICATIONS

Barret, "The Determination of Pore Volume and Area Distributions in Porous Substances. I. Computations from Nitrogen Isotherms", Journal of the American Chemical Society, 1951, vol. 73, pp. 373-380.
(Continued)

*Primary Examiner* — Sharon Pregler
(74) *Attorney, Agent, or Firm* — Steven A. Bern

(57) ABSTRACT

A filter media composition includes a ferrihydrite material having an average pore size (BJH) in a range from 1 to 3 nm and a surface area (BET) of at least 200 $m^2/g$ or at least 250 $m^2/g$ or at least 300 $m^2/g$.

5 Claims, 1 Drawing Sheet

(56) References Cited

U.S. PATENT DOCUMENTS

| | | | |
|---|---|---|---|
| 6,914,034 B2* | 7/2005 | Vo | B01D 53/64 |
| | | | 502/406 |
| 7,429,551 B2* | 9/2008 | Vo | B01D 53/64 |
| | | | 502/406 |
| 8,211,388 B2 | 7/2012 | Woodfield | |
| 8,877,677 B1 | 11/2014 | Rossin | |
| 2004/0106517 A1 | 6/2004 | Dlamini | |
| 2005/0247636 A1* | 11/2005 | Schlegel | B01J 20/0229 |
| | | | 210/688 |
| 2008/0035562 A1 | 2/2008 | Hata | |
| 2011/0201702 A1 | 8/2011 | Bali | |
| 2011/0257008 A1 | 10/2011 | Bartholomew | |
| 2011/0308524 A1 | 12/2011 | Brey | |
| 2013/0274093 A1 | 10/2013 | Woodfield | |
| 2013/0298768 A1 | 11/2013 | Walker | |
| 2013/0302231 A1 | 11/2013 | Aikens | |

FOREIGN PATENT DOCUMENTS

| | | |
|---|---|---|
| JP | 2013-255903 | 12/2013 |
| WO | WO 2003-043734 | 5/2003 |
| WO | WO 2004-047986 | 6/2004 |
| WO | WO 2009-105406 | 8/2009 |

OTHER PUBLICATIONS

Cao, "Mesoporous CuO—$Fe_2O^3$ composite catalysts for low-temperature carbon monoxide oxidation", Applied Catalysis B: Environmental, 2008, vol. 79, pp. 26-34.
Cheng, "Low-temperature CO oxidation over $CuO/Fe_2O^3$ catalysts", Catalysis Communications, 2007, vol. 8, pp. 1167-1171.
Cornell, "The influence of copper on the transformation of ferrihydrite ($5Fe_2O^3 \cdot 9H_2O$) into crystalline products in alkaline media", Polyhedron, 1988, vol. 7, No. 5, pp. 385-391.
Korableva, "Sorption properties of coprecipitated hydrated oxides of iron and zirconium", Colloid Journal of the USSR, 1984, vol. 45, No. 6, pp. 941-944.
Mathew, "Mesoporous 2-line Ferrihydrite by a Solution-Phase Cooperative Assembly Process for Removal of Organic Contaminants in Air", Chemistry a European Journal, 2011, vol. 17, pp. 1092-1095.
Mathew, "Mesoporous ferrihydrite with incorporated manganese for rapid removal of organic contaminants in air", Chemical Communicaions, 2012, vol. 48, pp. 10987-10989.
Mathew, "Mesoporous Ferrihydrite-Based Iron Oxide Nanoparticles as Highly Promising Materials for Ozone Removal", Angewandte Chemie, 2011, vol. 50, pp. 7381-7384.
Qiao, "Highly effective CuO/Fe(OH)x catalysts for selective oxidation of CO in $H_2$-rich Stream", Applied Catalysis B: Environmental, 2011, vol. 105, pp. 103-110.
Smith, "Novel synthesis and structural analysis of ferrihydrite" Inorganic Chemistry, 2012, vol. 51, pp. 6421-6424.
Stengl, "Mesoporous iron-manganese oxides for sulfur mustard and soman degradation", Materials Research Bulletin, 2012, vol. 47, pp. 4291-4299.
Stengl, "Reaction of sulfur mustard gas, soman and agent VX with nanosized anatase $TiO_2$ and ferrihydrite", Journal of Chemical Technology and Biotechnology, 2005, vol. 80, pp. 754-758.
Stengl, "Sulfur mustard degradation on zirconium doped Ti—Fe oxides", Journal of Hazardous Materials, 2011, vol. 192, pp. 1491-1504.
Stengl, "Zirconium doped nano-dispersed oxides of Fe, Al and Zn for destruction of warfare agents", Materials Characterization, 2010, vol. 61, pp. 1080-1088.
Vidales, "The effect of the starting solution on the physico-chemical properties of zinc ferrite synthesized at low temperature", Journal of Alloys and Compounds, 1999, vol. 287, pp. 276-283.
Zhang, "Nanostructured iron(III)-copper(II) binary oxide: A novel adsorbent for enhanced arsenic removal from aqueous solutions", Water Research, 2013, vol. 47, pp. 4022-4031.
Zhu, Erquin, "Mineralogy of Oceanic Manganese Nodules", Shandong University Press, May 1987, p. 99.
International Search Report for PCT International Application No. PCT/US2016/028364, dated Jul. 13, 2016, 5 pages.

* cited by examiner

FILTER MEDIA FOR RESPIRATORY PROTECTION

CROSS REFERENCE TO RELATED APPLICATIONS

This application is a continuation of Ser. No. 15/568,584, filed Oct. 23, 2017, which is a national stage filing under 35 U.S.C. 371 of PCT/US2016/028364, filed Apr. 20, 2016, which claims the benefit of Provisional Application No. 62/153,555, filed Apr. 28, 2015, the disclosure of which is incorporated by reference in its/their entirety herein.

BACKGROUND

Sorbents used in respiratory filter cartridges are typically based upon activated carbon. An attribute of activated carbon is its ability to adsorb organic vapors (OV). Activated carbons, although high in surface area, are generally unable to adsorb low boiling point polar compounds such as ammonia, thus some type of impregnant is used to react and trap the contaminant.

In order to filter other contaminant gases (hazardous' gases, e.g. acidic gases, ammonia, cyanides, aldehydes), chemicals are added to the activated carbon in a process known as impregnation. For example, the Lewis acidic transition metal salt $ZnCl_2$ is added to carbon to produce a sorbent for ammonia removal. Impregnation of any support (e.g., activated carbon) involves a balance of loading a sufficient amount of the reactive impregnant without destroying the high surface area of the support.

When considering inorganic materials as sorbent components, factors such as toxicity, stability under relevant conditions, and cost represent key attributes. Traditional carbon impregnants based upon copper and zinc are often oxides in the 2+ oxidation state, formed via thermolysis (at ca. 180-200° C.) of activated carbons treated with Cu and/or Zn salts that are soluble in aqueous or ammoniacal solutions. These inorganic materials alone, however, each commonly suffer from low porosity and surface area.

There are over a dozen known iron oxides including hydrated and hydroxide-containing materials. Generally, these compounds exist in nature and may also be synthesized in a laboratory. Iron oxides with high porosity and surface area are usually prepared using non-aqueous solvents, templating reagents, and high calcination temperatures. A naturally occurring iron oxide mineral known as 'two-line' ferrihydrite (henceforth referred to as ferrihydrite) is composed of nanocrystalline aggregates and is characterized by two poorly defined, broadened maxima in x-ray diffraction (XRD) methods.

SUMMARY

The present disclosure relates to filter media for respiratory protection. In particular the filter media is an unsupported ferrihydrite material that is capable of removing hazardous gases from a respiratory airstream. The ferrihydrite material can be prepared using low temperature, aqueous based processes and can be a doped material.

In one aspect, a composition includes a doped ferrihydrite material having an average pore size (BJH) in a range from 1 to 3 nm and a surface area (BET) of at least 200 $m^2/g$ or at least 250 $m^2/g$ or at least 300 $m^2/g$.

In another aspect, a respiratory protection filter includes a housing having an air stream inlet and an air stream outlet and containing an amount of filtration media in fluid connection and between the air stream inlet and the air stream outlet. The filtration media includes free-standing granular doped ferrihydrite material.

In a further aspect, a method includes combining a hydrated iron (III) salt with a metal dopant salt to form a mixture and blending a bicarbonate material with the mixture to form a wet doped ferrihydrite material and salt co-product. Then the method includes drying the wet doped ferrihydrite material and salt co-product to a moisture content of less than 10% by wt or less than 5% by wt to form a dried doped ferrihydrite material and salt co-product. Then, washing away the salt co-product with water to form a wet doped ferrihydrite material and drying the wet doped ferrihydrite material to a moisture content of less than 10% by wt or less than 5% by wt to form a dried doped ferrihydrite material.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
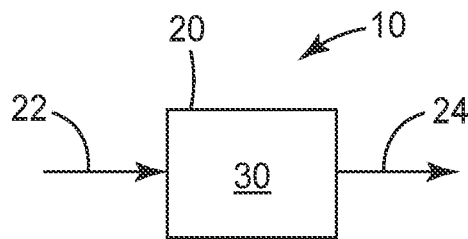
FIG. 1 is a schematic drawing of an illustrative respiratory protection filter.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties desired by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The term "free-standing" material refers to an unsupported material or a material that is not impregnated onto a support material.

The present disclosure relates to filter media for respiratory protection. In particular the filter media is an unsupported ferrihydrite material that is capable of removing reactive gases from a respiratory airstream. The ferrihydrite material can be formed using low temperature, aqueous based processes and can be a doped material. The ferrihydrite material has an average pore size in a range from 1 to 3 nm (BJH method) and a surface area of at least 200 $m^2/g$ or at least 250 $m^2/g$ or at least 300 $m^2/g$ (BET method). Filtration media within a respiratory protection filter has at least 20% by wt, or at least 30% by wt, or at least 50% by wt ferrihydrite material. The ferrihydrite material can be formed at temperatures below 115 degrees centigrade or below 110 degrees centigrade. Forming the ferrihydrite material includes at least one drying step that removes only water or moisture. The ferrihydrite material is granulated to a mesh size in a range from 12 to 50 U.S. standard sieve series. While the present disclosure is not so limited, an appreciation of various aspects of the disclosure will be gained through a discussion of the examples provided below.

FIG. 1 is a schematic drawing of an illustrative respiratory protection filter 10. The respiratory protection filter 10 includes a housing 20 having an air stream inlet 22 and an air stream outlet 24 and containing an amount of filtration media 30 in fluid connection and between the air stream inlet 22 and the air stream outlet 24. The filtration media 30 includes free-standing granular doped ferrihydrite material. In many embodiments, the filtration media 30 includes at least 20% wt or at least 30% wt or at least 50% wt ferrihydrite material or doped ferrihydrite material.

The filtration media 30 can include one or more additional types of filtration material, such as, activated carbon, for example. The ferrihydrite material is not impregnated onto a support material, such as activated carbon, for example.

The ferrihydrite material is capable of removing hazardous gas from an air stream passing through the filtration media 30 at ambient conditions or atmospheric pressure and −20 to 40 degrees centigrade and 5% to 95% relative humidity. These hazardous gases include both acidic and basic gases.

The ferrihydrite material described herein has an average pore size (BJH method) in a range from 1 to 3 nm and a surface area (BET) of at least 200 $m^2/g$ or at least 250 $m^2/g$ or at least 300 $m^2/g$. The doped ferrihydrite material has a molar ratio of iron:dopant in a range from 95:5 to 75:25 or from 90:10 to 80:20.

The ferrihydrite material can be doped with a dopant material comprising a metal such as Cu, Zn, Ca, Ti, Mg, Zr, Mn, Al, Si, Mo, Ag or mixtures thereof forming a doped ferrihydrite material. Dopants may be secondary metal oxides that are incorporated into the iron oxide for beneficial effect. In many embodiments, the doped ferrihydrite material includes Cu, Zn and/or Mn as dopant materials. The doped ferrihydrite material has a moisture content of less than 10% by wt or less than 5% by wt.

The ferrihydrite material forms a powder material that defines aggregate particles having a median largest lateral dimension in a range from 1 to 100 micrometers or from 15 to 45 micrometers or from 20 to 40 micrometers or about 30 micrometers. These particles are granulated to define granules having a mesh size in a range from 12 to 50 or from 20 to 40. Any useful granulation process can be utilized. In many embodiments, the granules are formed with compression and without the use of a binder. The ferrihydrite granules have a moisture content of less than 10% wt or less than 5% wt.

Figure 2:
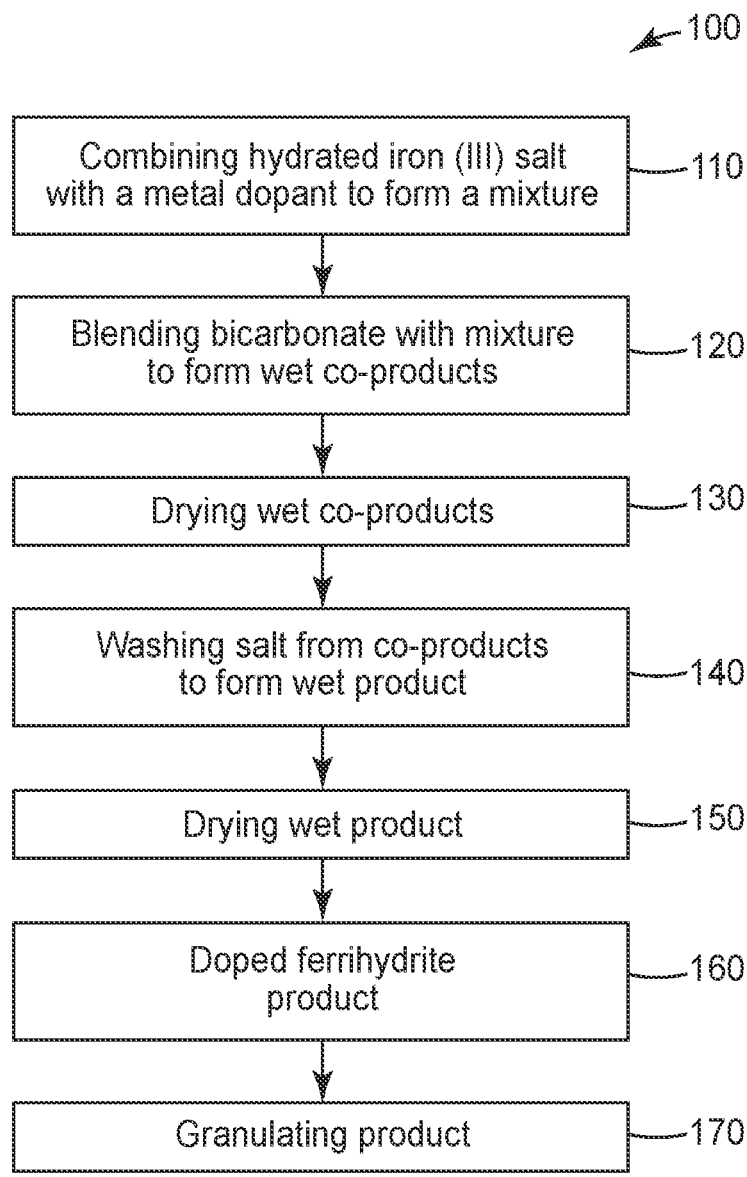
FIG. 2 is a flow diagram of an illustrative method.

FIG. 2 is a flow diagram of an illustrative method 100. The method includes combining a hydrated iron (III) salt with a metal dopant salt to form a mixture (powder mixture) at block 110 and blending a bicarbonate material (preferably a powder sodium bicarbonate) with the mixture to form a wet doped ferrihydrite material and salt co-product at block 120. Then drying the wet doped ferrihydrite material and salt co-product to a moisture content of less than 10% by wt or less than 5% by wt to form a dried doped ferrihydrite material and salt co-product at block 130. The salt co-product is washed away to form a wet doped ferrihydrite material at block 140. The wet doped ferrihydrite material is dried to a moisture content of less than 10% by wt or less than 5% by wt to form a dried doped ferrihydrite material at block 150. The doped ferrihydrite material at block 160 is then granulated to form a granulated filtration media product at block 170.

The method 100 occurs at relatively low temperatures. In many embodiments the method 100 has a processing temperature for all the steps that is no greater than 115 degrees centigrade or no greater than 110 degrees centigrade. In many embodiments, the drying steps 130, 150 removes only water or moisture from the wet doped ferrihydrite material and salt co-product or the wet doped ferrihydrite material.

A general illustrative procedure for the preparation of the doped ferrihydrite material described herein involves:

(i) The combination and mixing of solid $Fe(NO_3)_3.9H_2O$ and another metal salt (e.g. Cu, Zn, Mn, Al) in an appropriate stoichiometric ratio, in a mixing vessel. The powders are mixed so that they appear to be a free-flowing (e.g., no obvious lumps) powder and relatively homogeneous.

(ii) The addition of free-flowing bicarbonate powder in an appropriate ratio.

(iii) The resulting powder mixture is then ground together either manually or with mechanical stirring to mix the reagents. This mixture becomes frothy ($CO_2$ evolution and water release) over the course of the reaction and gradually darkens to a red-orange slurry. Mixing continues until gas evolution ceases. After this time period the stirred mixture thickens to a solid brownish solid.

(iv) The resulting brown material is placed in an oven at 100-105° C. for a period of time to dry to less than 10% by wt water. After this time period, nitrate salts and possible other co-products are observed in the dried material.

(v) The solid is then transferred to a filtration apparatus and washed with an appropriate amount of water to rid the solid of water-soluble salt co-products.

(vi) The washed material is placed in an oven at 100-105° C. for a period of time to dry to less than 10% by wt or less than 5% by wt water. This product has a brownish color.

An additional procedure for the preparation of doped ferrihydrite material involves the precipitation of iron and secondary metal salts dissolved together in an aqueous solution. This is accomplished by raising the pH of the acidic metal salt solution to pH 7-8 by the addition of a base, as described in Example 6 below. This method may form more heavily aggregated materials than Examples 1-5, resulting in larger particle sizes as reported in Table 2.

Objects and advantages of this disclosure are further illustrated by the following examples, but the particular materials and amounts thereof recited in these examples, as well as other conditions and details, should not be construed to unduly limit this disclosure.

EXAMPLES

All parts, percentages, ratios, etc. in the examples are by weight, unless noted otherwise. Solvents and other reagents used are obtained from Sigma-Aldrich Corp., St. Louis, Mo. unless specified differently.
Material Listing Unless otherwise indicated, $Fe(NO_3)_3.9H_2O$, $Cu(NO_3)_2.2.5H_2O$, $Zn(NO_3)_2.6H_2O$, $Fe_2(SO_4)_3.2.5H_2O$, $CuSO_4.5H_2O$, NaOH, $NH_4HCO_3$, and $NaHCO_3$ were obtained in reagent grade from Sigma-Aldrich Co. (St. Louis, Mo., USA).

Example 1

Un-doped ferrihydrite was prepared according to the procedure given in Inorg. Chem. 51 (2012) 6421. In summary, 0.05 mol $Fe(NO_3)_3.9H_2O$ was combined with 0.15 mol of $NH_4HCO_3$ for 30 minutes in a mortar and pestle. After drying the resulting product for 14 hours at 100° C. in a muffle furnace under static air, the material was washed with three 50 mL portions of deionized water using a 5 cm diameter Buchner funnel and vacuum filter apparatus equipped with Fisherbrand filter paper (medium porosity, Grade P5). The filtered solid was then dried at 100° C. for 14 hours to a moisture content of less than 5 wt. %. The resulting material was then formed into pellets using a 13 mm die and Carver press using a pressure of 70000 PSI. The pellets were then crushed and sized to 20×40 mesh granules.

Example 2

Un-doped ferrihydrite was prepared using a similar procedure to Example 1, with the exception that $NaHCO_3$ was used instead of $NH_4HCO_3$. $NaHCO_3$ was added to pre-ground $Fe(NO_3)_3.9H_2O$ with stirring over the course of approximately 30 seconds. The powder mixture became reddish orange and carbon dioxide gas evolution was noticed during stirring over the course of the first few minutes. Manual stirring with the pestle was continued for approximately 25 minutes until the dark brown slurry hardened and gas evolution was no longer noticeable. The solid mixture was then dried and placed in an oven set at 100° C. After 14 hours, the dried solid appeared to have a white powder coating on top of the clumped material. The solid was filtered, washed and dried and formed into granules in an analogous fashion to Example 1.

Example 3

Copper-doped ferrihydrite was prepared with an initial Cu:Fe molar ratio of 1:9. The pre-ground powders $Fe(NO_3)_3.9H_2O$ (909 g, 2.25 mol), $Cu(NO_3)_2.2.5H_2O$ (59.7 g, 0.25 mol) and $NaHCO_3$ (609 g, 7.25 mol) were weighed into separate containers. The copper(II) nitrate was then combined with the iron(III) nitrate in a 4L stainless steel bowl and the powders were mixed intimately for several minutes with a pestle. After addition of the sodium bicarbonate, the powder mixture became reddish orange and carbon dioxide gas evolution was noticed during stirring over the course of the first few minutes. Manual stirring with the pestle was continued for approximately 45 minutes until the dark brown slurry hardened and gas evolution was no longer noticeable. The solid mixture was then dried and placed in a forced air oven set at 100° C. for 14 hours, after which time the dried solid appeared to have a white powder coating on top of the clumped material. The solid was then transferred to an 11 cm diameter Buchner funnel fitted with Fisherbrand filter paper (coarse porosity, Grade P8). After attachment of the funnel to a vacuum filtration flask, the solid was washed with deionized water (3.5 L in 500 mL portions). The solid was filtered and dried to a moisture content of less than 5 wt. % and formed into granules in an analogous fashion to Example 1.

Example 4

Copper-doped ferrihydrite was prepared with an initial Cu:Fe molar ratio of 1:4 in an analogous procedure to Example 3, with the exception that $NH_4HCO_3$ was used in place of $NaHCO_3$. After the first drying step, the dried solid appeared to have some bluish-white crystals deposited on the top surface. Instead of a colorless wash as observed in Example 3, a bluish colored filtrate was observed for the first 2 L of wash water used. The filtered solid was dried to a moisture content of less than 5 wt. % and formed into granules in an analogous fashion to Example 1.

Example 5

Zinc-doped ferrihydrite was prepared with an initial Zn:Fe molar ratio of 1:4 in an analogous procedure that led to Example 4, with the exception that $Zn(NO_3)_2.6H_2O$ was used in place of $Cu(NO_3)_2.2.5H_2O$, and 6.75 mol of $NH_4HCO_3$ was used instead of 7.25 mol. Instead of a blue wash as observed in Example 4, an orange colored wash was observed. The filtered solid was dried to a moisture content of less than 5 wt. % and formed into granules in an analogous fashion to Example 1.

Example 6

Copper-doped ferrihydrite was prepared with an initial Cu:Fe ratio of 1:9. A solution of $Fe_2(SO_4)_3.2.5H_2O$ (50.6 g, 0.10 mol) was prepared in 500 mL deionized water. A separate solution of $CuSO_4.5H_2O$ (5.74 g, 0.023 mol) was prepared in 500 mL deionized water. These solutions were then added to a 2000 mL beaker and stirred magnetically. After 5-10 minutes of mixing, 3.0 mol/L NaOH solution was added dropwise using a MasterFlex© peristaltic pump at a flow rate of approximately 3.4 mL/min. The flow of NaOH was terminated after 227 mL was added and the pH of the reaction mixture was approximately 7. The mixture was left to stir for 1.5 hours after the base addition was complete. Stirring was then stopped and the mixture was left to settle overnight for 16 hours. A major portion (approximately 70% by reaction mixture volume) of the resulting supernatant was decanted from the beaker, and the remaining contents were then transferred to an 11 cm diameter Buchner funnel fitted with Fisherbrand filter paper (coarse porosity, Grade P8). After attachment of the funnel to a vacuum filtration flask, the solid was washed with deionized water (750 mL in 250 mL portions). The solid was filtered and dried to a moisture content of less than 10 wt. %. The dried material was crushed and sized to 20×40 mesh granules.
Testing Methods
Tube Testing A tube testing apparatus was used for breakthrough testing. The sample tubes employed are composed of polyvinylchloride (PVC) (inner diameter=6.5 mm) with a fine stainless steel mesh near the base. These tubes are loaded with a specified volume of filter media granules for testing and are packed to a constant volume by repeatedly tapping the lower end against a hard surface. The sample tube is connected to flexible Teflon tubing using ultra-torr (Swagelok) fittings. Challenge gases of desired concentrations are then delivered through the vertical tube through the top (inlet) portion of the tube at a specified flow rate and the effluent gas that exits the sorbent bed through the lower end of the tube (outlet) is then transported to a detector for analysis.

$SO_2$ Breakthrough Testing:

A sample of filter media granules, either obtained from a commercial vendor or prepared according to a given example, equating to a volume of either 1 or 1.7 cc was transferred to the tube testing apparatus outlined above and weighed. In this case the outlet gas stream was analyzed by a MIRAN SapphIRe IR portable air analyzer. The filter media granules were "tapped" until no significant reduction in volume was observed by the human eye. The sample in the tube was then exposed to a test stream of approximately 200 mL/minute of conditioned air (<15% RH) that contained about 1000 ppm of sulfur dioxide ($SO_2$) in air from a certified gas mixture from Linde (Whitby, ON, Canada). The air downstream from the filter media granules was monitored for breakthrough using a MIRAN SapphIRe IR portable air analyzer. The breakthrough time was defined as the time at which a concentration of 20 ppm was observed downstream from the sample.

$NH_3$ Breakthrough Testing:

A sample of filter media granules, either obtained from a commercial vendor or prepared according to a given example, equating to a volume of either 1 or 1.7 cc was transferred to the tube testing apparatus outlined above and weighed. In this case the outlet gas stream was analyzed by a MIRAN SapphIRe IR portable air analyzer. The filter media granules were "tapped" until no significant reduction in volume was observed by the human eye. The sample in the tube was then exposed to a test stream of approximately 200 mL/minute of conditioned air (<15% RH) that contained about 1000 ppm of ammonia ($NH_3$) in air from a certified gas mixture from Linde (Whitby, ON, Canada). The air downstream from the filter media granules was monitored for breakthrough using a MIRAN SapphIRe IR portable air analyzer. The breakthrough time was defined as the time at which a concentration of 20 ppm was observed downstream from the sample.

HCN Breakthrough Testing:

A sample of filter media granules, either obtained from a commercial vendor or prepared according to a given example, equating to a volume of 1.7 cc was transferred to the tube testing apparatus outlined above and weighed. In this case the outlet gas stream was analyzed by a gas chromatograph with a flame ionization detector (GC-FID). The filter media granules were "tapped" until no significant reduction in volume was observed by the human eye. The sample in the tube was then exposed to a test stream of approximately 260 mL/minute of conditioned air (<15% RH) that contained about 2000 ppm of hydrogen cyanide (HCN). The air downstream from the filter media granules was monitored for breakthrough using a GC-FID system for both HCN, the challenge gas, and cyanogen (NCCN), a common reaction product of HCN. The breakthrough time was defined as the time at which a concentration of 5 ppm HCN or NCCN was observed downstream from the sample.

Powder X-ray Diffraction:

Powder X-ray diffraction patterns were collected using a Phillips PW 1720 X-ray generator operated at a voltage of 40 kV and a current of 30 mA. The system is equipped with a Cu Kα radiation source (wavelength=1.54178 Å) and a diffracted beam monochromator. Typical conditions were a scan rate of 0.05°/step and a dwell time of 40 s/step. The samples were ground into fine powder and mounted on an aluminum sample holder.

Surface Area and Pore Size Measurements:

$N_2$ adsorption isotherm and the pore size distribution were determined using a Micromeritics ASAP2010 at 77K. Samples were degassed at 100° C. for 2-3 days before the measurement to remove residual moisture. Pore size distributions were determined using the BJH method (1-300 nm) using software supplied by Micromeritics (ASAP 2010 V5.03 C). The BJH method is a known method and is described at E. P. Barrett, L. G. Joyner, P. H. Halenda, J. Am. Chem. Soc. 73 (1951) 373.

Particle Size Measurements:

Particle size measurements (d(0.1), d(0.5) and d(0.9)) were made on a Mastersizer 2000 (Ver. 5.60) equipped with a Hydro2000S accessory from Malvern Instruments following 2 minutes of sonication using deionized water as a dispersant.

TABLE 1

Selected Characterization Data for Examples 1-5.

| Example | Particle Size d(0.1, 0.5, 0.9) (μm) | Phase by XRD | BET Surface Area ($m^2/g$) | BJH Average Pore Volume ($cm^3/g$) | BJH Average Pore Size (nm) |
|---|---|---|---|---|---|
| 1 | 7.4, 27.0, 58.1 | 2-line ferrihydrite | 302.5 | 0.13 | 2.1 |
| 2 | 12.0, 29.2, 56.3 | 2-line ferrihydrite | 289.0 | 0.17 | 2.2 |
| 3 | 11.8, 28.4, 53.5 | 2-line ferrihydrite | 305.2 | 0.14 | 2.1 |
| 4 | 10.9, 31.2, 64.0 | 2-line ferrihydrite | 329.9 | 0.14 | 1.9 |
| 5 | 11.0, 34.2, 75.5 | 2-line ferrihydrite | 276.8 | 0.085 | 1.7 |

TABLE 2

Selected Characterization Data for Examples 6.

| Example | Particle Size d(0.1, 0.5, 0.9) (μm) | Phase by XRD | BET Surface Area ($m^2/g$) | BJH Average Pore Volume ($cm^3/g$) | BJH Average Pore Size (nm) |
|---|---|---|---|---|---|
| 6 | 8.7, 127.7, 615.9 | 2-line ferrihydrite | 366.7 | 0.25 | 2.7 |

The samples of Examples 1-5 were challenged with vapors or gases using the test methods described above. The test results are shown below in Table 3 along with the test results from commercially available Calgon URC, a whetlerite multigas adsorbant prepared by impregnation of activated carbon with copper compounds, molybdenum compounds and salts of sulfuric acid.

TABLE 3

Breakthrough Test Results

| | Breakthrough Time (minutes)[5] | | | |
|---|---|---|---|---|
| Example[1,2,3] | SO$_2$ (±10%) | NH$_3$ (±10%) | HCN (±6%) | NCCN (±6%) |
| Calgon URC[4] | 44 | 52 | 111 | 105 |
| 1 | 97 | 110 | 6 | 21 (0.6 ppm) |
| 2 | 156 | 69 | 35 | 53 (0.4 ppm) |
| 3 | 165 | 113 | 106 | 100 |
| 4 | 165 | 173 | 165 | 153 |
| 5 | 67 | 275 | 15 | 12 |

[1]All filter media granules tested at 20 × 40 mesh size.
[2]Sample volume: 1 cc (SO$_2$, NH$_3$); 1.7 cc (HCN/NCCN)
[3]Average of 3 tests for breakthrough times
[4]Calgon URC (as received), commercially available from Calgon Carbon Company, Pittsburgh, PA, USA.
[5]For samples where NCCN was not observed to reach breakthrough concentration during HCN testing, NCCN breakthrough time is listed with the detected concentration of NCCN at the end of the test in parenthesis.

TABLE 4

Breakthrough Test Results

| | Breakthrough Time (minutes)[5] | | | |
|---|---|---|---|---|
| Example[1,2,3] | SO$_2$ (±10%) | NH$_3$ (±10%) | HCN (±6%) | NCCN (±6%) |
| Calgon URC[4] | 44 | 52 | 111 | 105 |
| 6 | 220 | 80 | 123 | 133 |

[1]All filter media granules tested at 20 × 40 mesh size.
[2]Sample volume: 1 cc (SO$_2$, NH$_3$); 1.7 cc (HCN/NCCN)
[3]Average of 3 tests for breakthrough times
[4]Calgon URC (as received), commercially available from Calgon Carbon Company, Pittsburgh, PA, USA.
[5]For samples where NCCN was not observed to reach breakthrough concentration during HCN testing, NCCN breakthrough time is listed with the detected concentration of NCCN at the end of the test in parenthesis.

Thus, embodiments of FILTER MEDIA FOR RESPIRATORY PROTECTION are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A method, comprising:
   combining a hydrated iron (III) salt with a metal dopant salt comprising Cu to form a mixture;
   blending a bicarbonate material with the mixture to form a wet doped ferrihydrite material and salt co-product;
   drying the wet doped ferrihydrite material and salt co-product to a moisture content of less than 10% by wt or less than 5% by wt to form a dried doped ferrihydrite material and salt co-product;
   washing away the salt co-product with water to form a wet doped ferrihydrite material; and
   drying the wet doped ferrihydrite material to a moisture content of less than 10% by wt to form a dried doped ferrihydrite material.

2. The method according to claim 1, wherein the bicarbonate material is sodium bicarbonate.

3. The method according to claim 1, wherein the method has a processing temperature for all method steps that is no greater than 115 degrees centigrade.

4. The method according to claim 1, wherein the drying steps removes only water or moisture from the wet doped ferrihydrite material and salt co-product or the wet doped ferrihydrite material.

5. The method according to claim 1, wherein the metal dopant salt comprises Zn.

* * * * *